United States Patent
Sasaki et al.

[19]

[11] Patent Number: 5,914,930
[45] Date of Patent: Jun. 22, 1999

[54] INFORMATION RECORDING MEDIUM AND INFORMATION REPRODUCING APPARATUS FOR USE THEREWITH

[75] Inventors: Norimasa Sasaki, Saitama; Tetsu Yanagisawa, Tokyo, both of Japan

[73] Assignee: Sony Corporation, Tokyo, Japan

[21] Appl. No.: 07/930,266

[22] Filed: Aug. 13, 1992

[30] Foreign Application Priority Data

Aug. 20, 1991 [JP] Japan ................................. 3-232209

[51] Int. Cl.⁶ ................................................. G11B 27/19
[52] U.S. Cl. ........................ 369/275.3; 369/49; 369/59; 369/32; 434/307 A; 386/96; 386/105; 84/601
[58] Field of Search ................................. 369/275.3, 58, 369/49.32; 364/232.5, 964; 365/218; 84/601; 386/95, 105, 96; 434/307 A

[56] References Cited

U.S. PATENT DOCUMENTS

| | | | |
|---|---|---|---|
| 5,029,125 | 7/1991 | Sciupac | 365/218 |
| 5,130,966 | 7/1992 | Yoshio et al. | 369/49 |
| 5,131,311 | 7/1992 | Murakami et al. | 434/307 A |
| 5,208,679 | 5/1993 | Yamauchi et al. | 386/105 |
| 5,210,734 | 5/1993 | Sakurai | 369/49 |
| 5,214,781 | 5/1993 | Miki et al. | 369/59 |
| 5,247,126 | 9/1993 | Okamura et al. | 434/307 A |
| 5,627,657 | 5/1997 | Park | 369/32 |

FOREIGN PATENT DOCUMENTS

| | | | |
|---|---|---|---|
| 0 245 904 A1 | 11/1987 | European Pat. Off. | H04N 1/21 |
| 0 325 325 A2 | 7/1989 | European Pat. Off. | G11B 27/28 |
| 0 424 903 A3 | 2/1991 | European Pat. Off. | G11B 27/28 |
| 0 488 676 A2 | 3/1992 | European Pat. Off. | G06F 15/40 |
| 0 391 771 A1 | 10/1990 | France | H04J 3/16 |

OTHER PUBLICATIONS

How CD–Interactive Works, Image Technology vol. 72, No. 5, pp. 186–187, May 1990.

*Primary Examiner*—Tod R. Swann
*Assistant Examiner*—Kim-Kwok Chu
*Attorney, Agent, or Firm*—Limbach & Limbach L.L.P.

[57] ABSTRACT

An information recording medium and an information reproducing apparatus for use therewith for putting information into a system easily and quickly. The information recording medium records, in units of blocks, reproduction data such as voice data, image data and text data as well as reproduction data management information including address information and continuous reproduction information. The address information is built in a layered structure to designate addresses at which the reproduction data are stored. The continuous reproduction information specifies any one of two ways, i.e., continuously or selectively, in which to reproduce the reproduction data. The information reproducing apparatus comprises discriminating means for discriminating the continuous reproduction information in each block, and reproducing means for reproducing the reproduction data in units of blocks continuously or selectively depending on the result of the discrimination by the discriminating means.

12 Claims, 6 Drawing Sheets

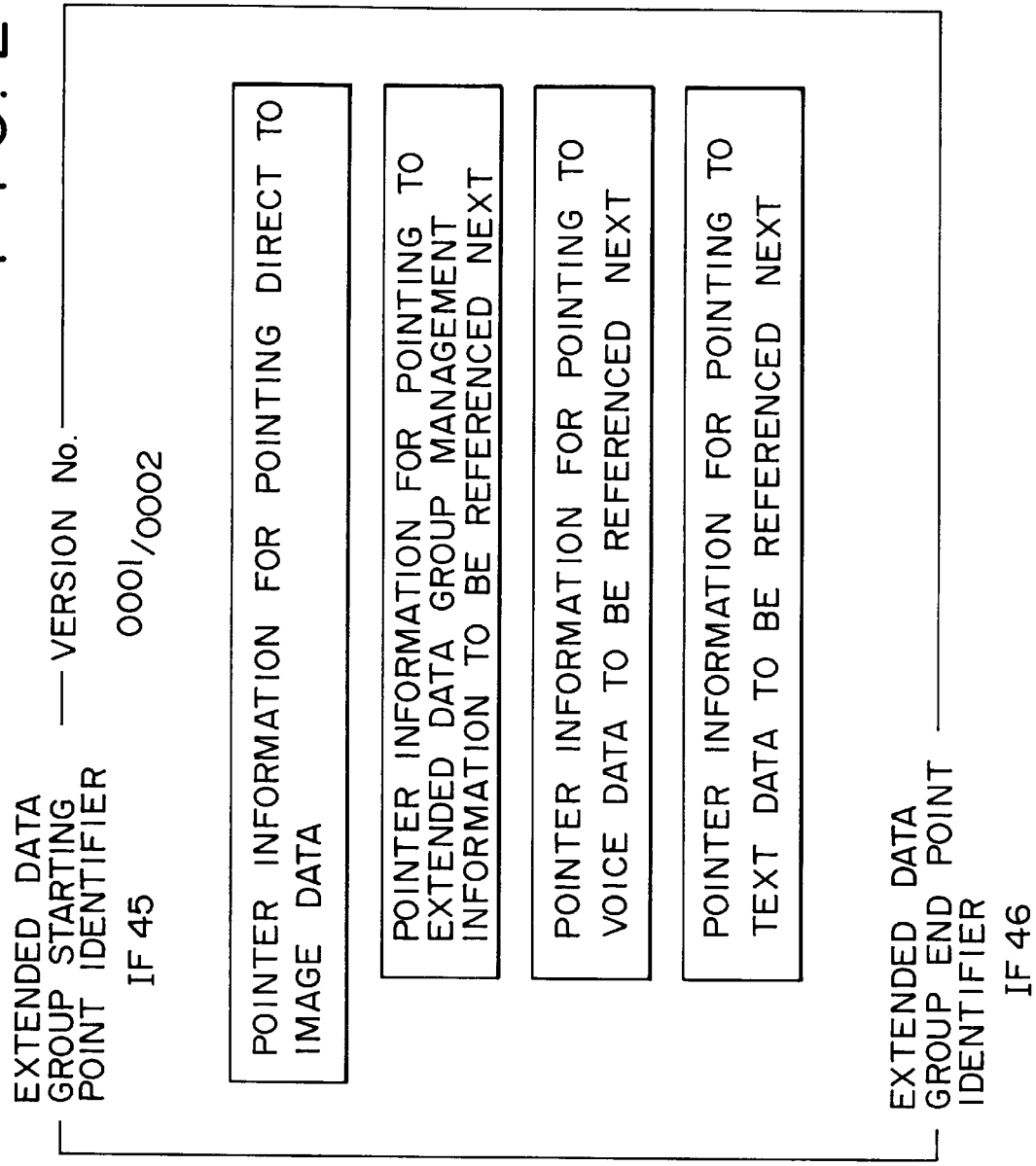

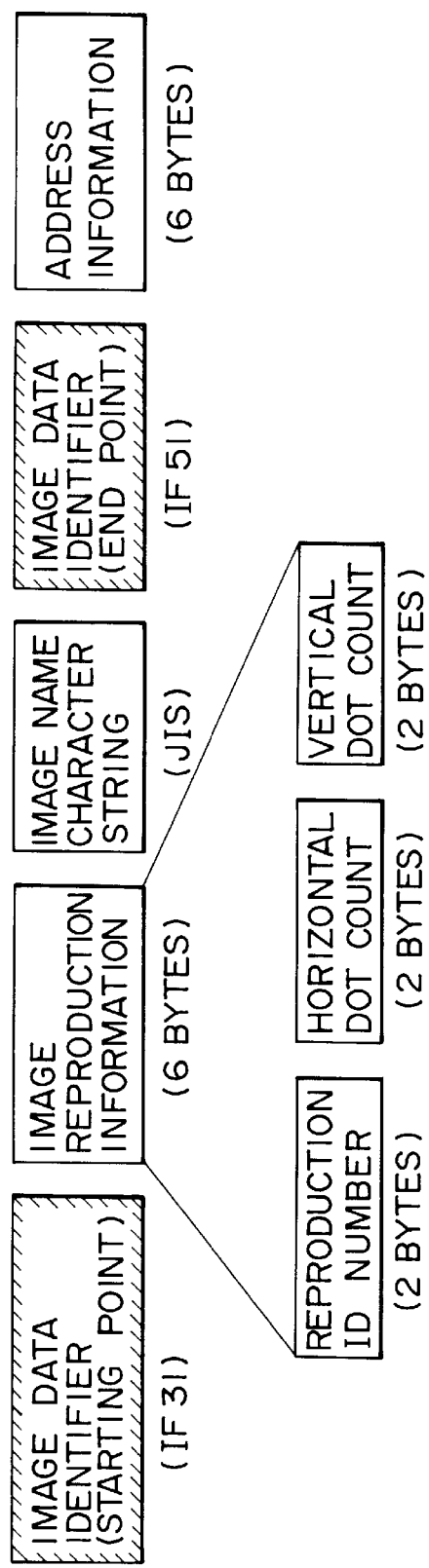
F I G. 3(A)
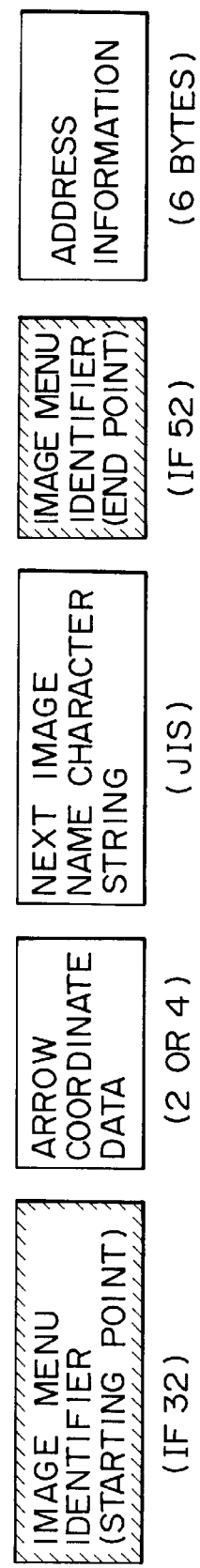
F I G. 3(B)

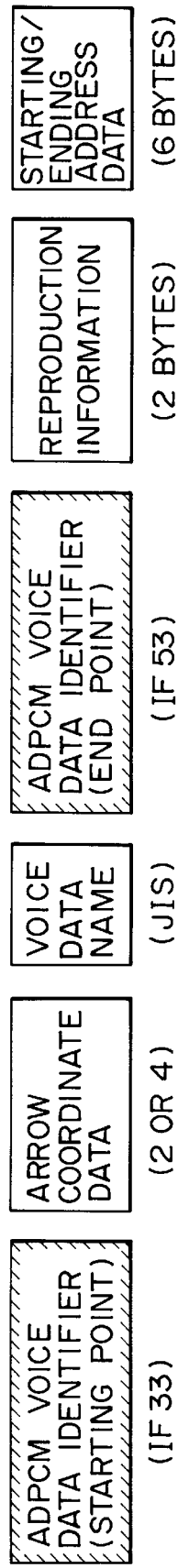
F I G. 3(C)
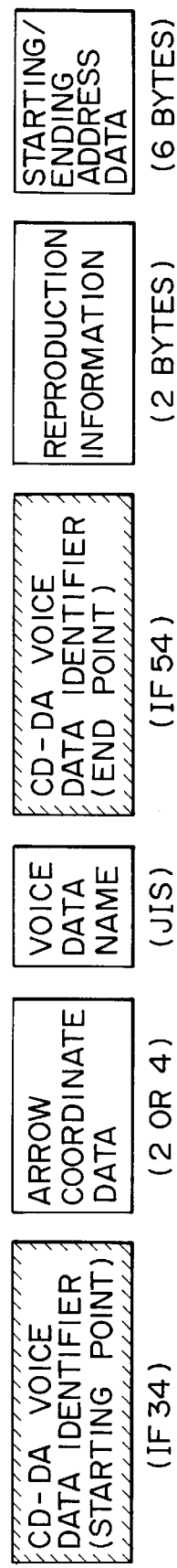
F I G. 3(D)
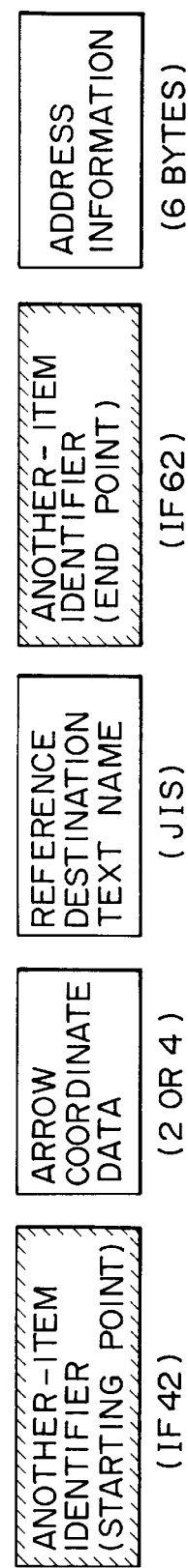
F I G. 3(E)

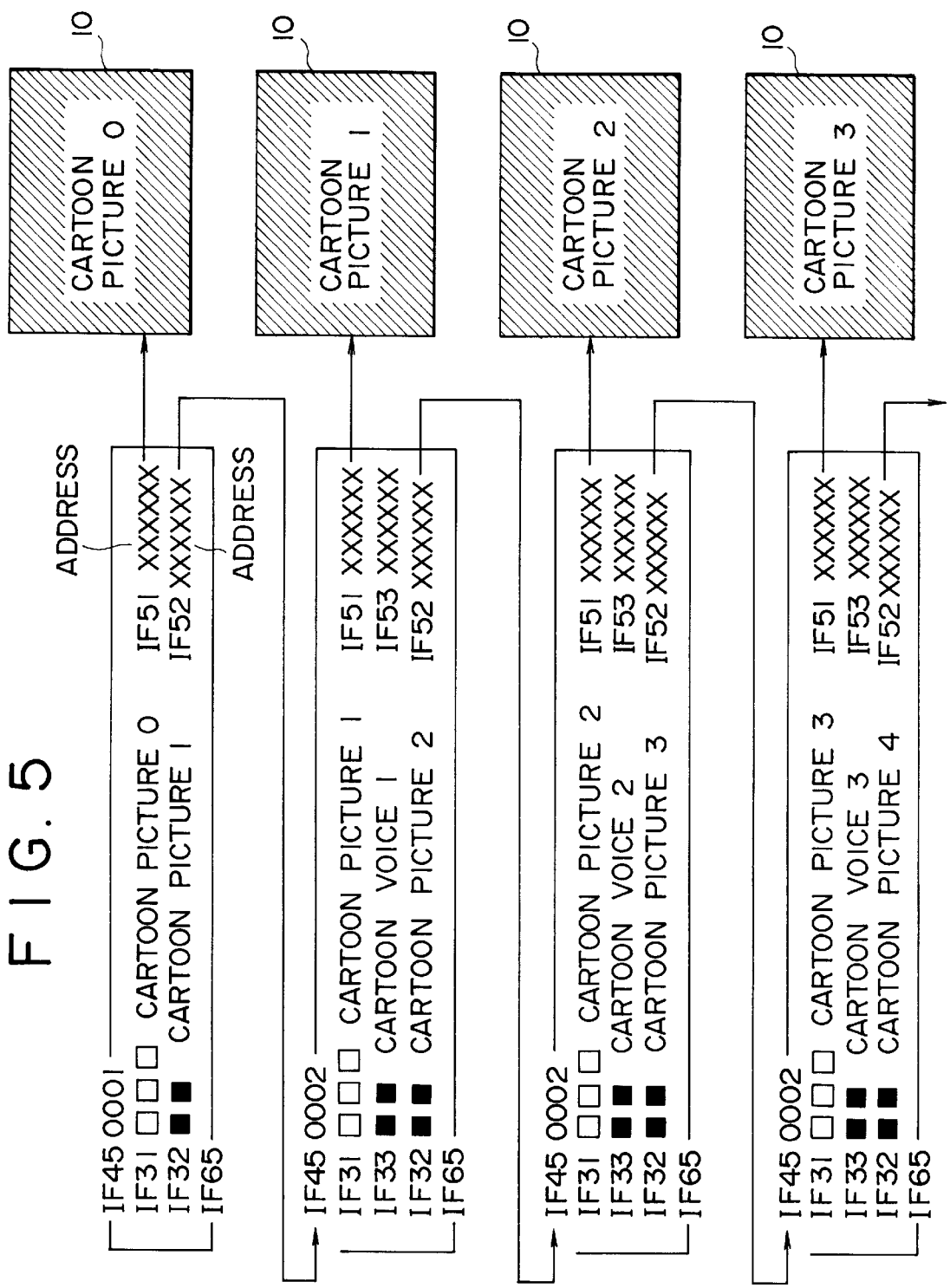

INFORMATION RECORDING MEDIUM AND INFORMATION REPRODUCING APPARATUS FOR USE THEREWITH

BACKGROUND OF THE INVENTION

1. Field of the Invention

The present invention relates to an information recording medium and an information reproducing apparatus for use therewith, practiced illustratively as a CD-ROM and a CD-ROM reproducing apparatus.

2. Description of the Prior Art

Reproducing apparatuses using a CD-ROM are now commercially available. Dictionary data and other information are recorded on the CD-ROM that is run on the apparatus. In operation, a user typically enters a desired word through a keyboard of the apparatus. The apparatus in turn reads from the CD-ROM the information about the word just entered and displays the retrieved information on an LCD or the like attached thereto. The reproducing apparatus is convenient with its ability to search for the meaning of each designated word easily and quickly.

Conventional information reproducing apparatuses of the above type are equipped each with a program by which to retrieve information in a way that complies with individual dictionaries. As a result, to implement one system requires first determining the manner of information retrieval, called a scenario, and getting specialized programmers to program that scenario. The implementing process is costly because it is time-consuming and labor-intensive.

SUMMARY OF THE INVENTION

It is therefore an object of the present invention to overcome the above-described drawbacks and disadvantages and to provide an information recording medium and an information reproducing apparatus for use therewith, both constituting an information retrieval system easily, quickly and at low cost.

In carrying out the invention and according to one aspect thereof, there is provided an information recording medium for recording, in units of blocks, data such as voice data, image data and text data as well as management information for managing the data, the management information including: address information, built in a layered structure, about addresses at which the data to be reproduced are stored; and continuous reproduction information for specifying any one of two ways in which to reproduce the data, one of the two ways being that in which the data are to be reproduced continuously, the other of the two ways being that in which the data are to be reproduced selectively.

According to another aspect of the invention, there is provided an information reproducing apparatus for reproducing an information recording medium recording, in units of blocks, reproduction data such as voice data, image data and text data as well as reproduction data management information including address information and continuous reproduction information, the address information being built in a layered structure to designate addresses at which the reproduction data are stored, the continuous reproduction information specifying any one of two ways in which to reproduce the reproduction data, one of the two ways being that in which the reproduction data are to be reproduced continuously, the other of the two ways being that in which the reproduction data are to be reproduced selectively, the information reproducing apparatus comprising: discriminating means for discriminating the continuous reproduction information in each block; and reproducing means for reproducing the reproduction data in units of blocks and in any one of the two ways in which to reproduce the reproduction data depending on the result of the discrimination by the discriminating means.

The information recording medium according to the invention comprises blocks each containing both the addresses of the information to be reproduced and the continuous reproduction information for specifying whether the information in any block is to be reproduced continuously or selectively. This makes it possible to put information into a system easily, quickly and at low cost without the help of specialized programmers.

The information reproducing apparatus according to the invention discriminates the continuous reproduction information recorded on the above-described information recording medium and, depending on the result of the discrimination, reproduces continuously or selectively the information recorded in the layered structure on the medium. This arrangement eliminates the need for providing each information recording medium with a specialized program for information retrieval. With the same apparatus retrieving information from various information recording media without the help of the specialized retrieval program, the costs of both the media and the apparatus are reduced significantly.

These and other objects, features and advantages of the invention will become more apparent upon a reading of the following description and appended drawings.

BRIEF DESCRIPTION OF THE DRAWINGS

FIG. 2 is a view describing a typical format of a CD-ROM 12 contained in the embodiment of FIG. 2;

FIG. 3 is a set of views depicting the various kinds of pointer information outlined in FIG. 2;

FIG. 5 is a view of specific display screens that are illustratively provided by the embodiment.

DESCRIPTION OF THE PREFERRED EMBODIMENT

Figure 1:
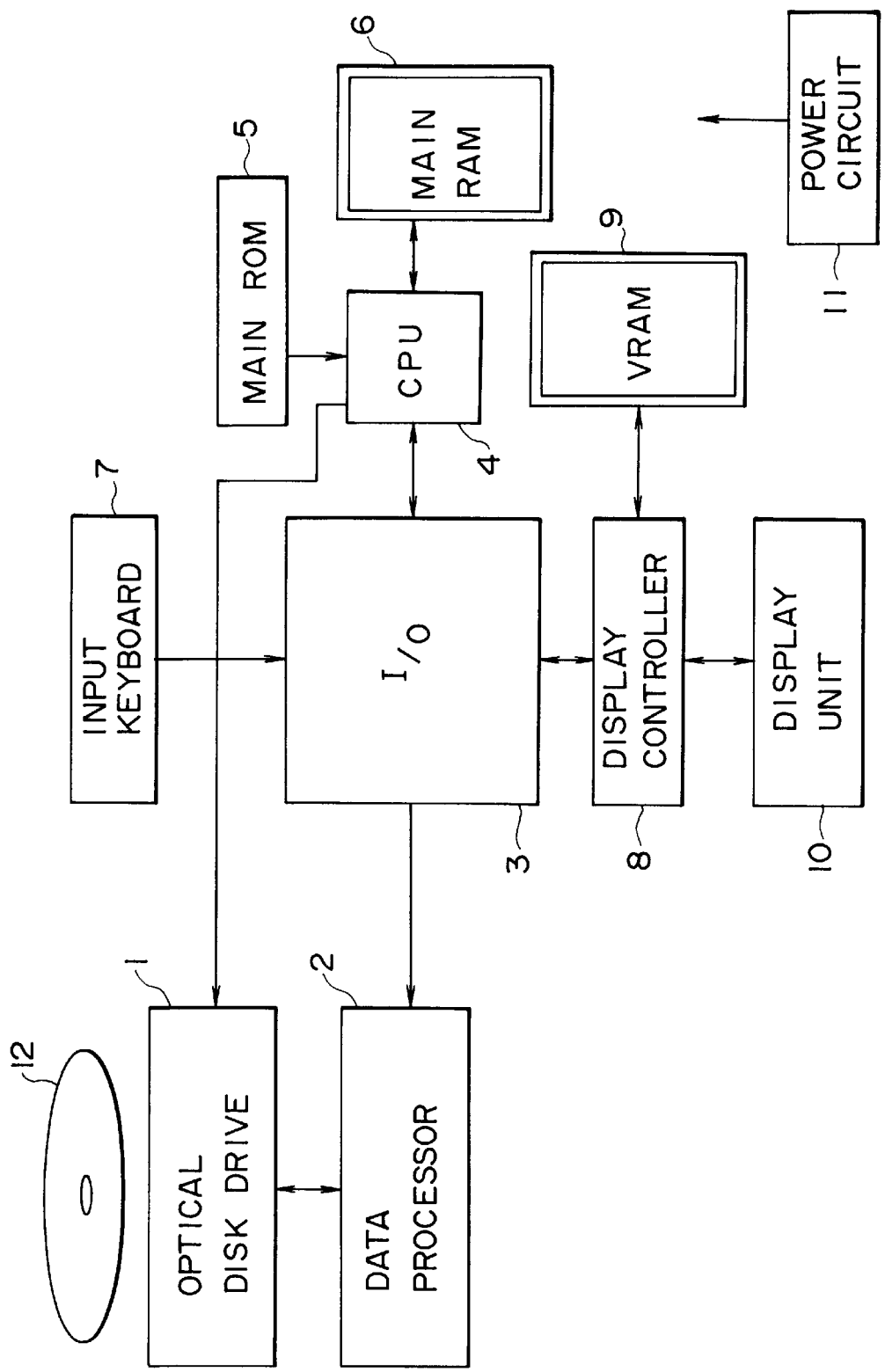
FIG. 1 is a block diagram of an information recording medium and an information reproducing apparatus for use therewith, both embodying the invention.

FIG. 1 is a block diagram of an information recording medium and an information reproducing apparatus for use therewith, both embodying the invention. An optical disk drive 1 accommodates various types of CD-ROM 12. When a CD-ROM 12 is mounted on the optical disk drive 1, the latter reproduces information from the former. A data processor 2 receives an RF signal from the optical disk drive, demodulates the signal, and outputs the demodulated signal in digital format. An I/O port 3 exchanges commands and data with the data processor 2, a CPU 4, an input keyboard 7 and a display controller 8. A main ROM 5 contains programs needed to operate the CPU 4. A main RAM 6 accommodates data and the like as needed. A VRAM 9 stores image data to be displayed on a display unit 10 made of a CRT, LCD or the like. The component circuits are powered by a power circuit 11.

The CD-ROM 12 contains, in units of blocks, management information about various kinds of information such as voice, image and text information (i.e., constituting extended data group management information). FIG. 2 illustrates a typical format of each of the blocks. The starting point of each block is defined by an identifier 1F45 and the end point by an identifier 1F65.

Each of the blocks contains a version number (i.e., continuous reproduction information). The version number is either "0001" or "0002." The version number "0001" stipulates that information recorded in a layered structure (to be discussed later) within each block is to be displayed (or otherwise output) selectively. The version number "0002" specifies that the information is to be displayed (output) continuously. Program designers may specify a desired version number for each block for continuous or selective information display. Selective display of information involves waiting for a user to make an entry (i.e., make a choice) before the relevant information is displayed.

The following kinds of information are recorded as needed in the layered structure in each block:

(1) Pointer information for pointing direct to image data
(2) Pointer information for pointing to the extended data group management information (block) to be referenced next
(3) Pointer information for pointing to the voice data to be referenced next
(4) Pointer information for pointing to the text data to be referenced next Referring to FIG. 3(A), the information (1) above is recorded one item per block. This information has two identifiers (image data identifiers) 1F31 and 1F51 designating the starting point and end point of the target piece of image data, respectively. The pointer information (2) above is used to specify that one piece of text data (or image data) is to reference another piece of image data. As shown in FIG. 3(B), the information (2) has two identifiers (image menu identifiers) 1F32 and 1F52 designating the starting point and end point of the target piece of image data, respectively. Referring to FIGS. 3(C) and 3(D), the pointer information (3) points to two types of data: ADPCM voice data and CD-DA voice data. The information (3) pointing to ADPCM-format voice data has two identifiers 1F33 and 1F53 designating the starting point and end point of the target piece of voice data, respectively; the information (3) pointing to CD-DA-format voice data has two identifiers 1F34 and 1F54 also designating the starting point and end point of the target piece of voice data, respectively. Referring to FIG. 3(E), the pointer information (4) has two identifiers (text data identifiers) 1F42 and 1F62 designating the starting point and end point of the target piece of text data. Up to 10 pieces of information of the types (2) through (4) may be contained in a single block.

FIG. 3(A) shows a typical constitution of the pointer information for pointing direct to image data. As illustrated, image reproduction information and an image name character string are located between identifiers 1F31 and 1F51. The image reproduction information is made of a reproduction identification number, a horizontal dot count and a vertical dot count. The reproduction identification number is an ID number set in an image management table containing a plurality of pieces of detailed information about image reproduction (e.g., data type, compression method, resolution). The larger the number of reproduction identification numbers set in the image management table, the larger the number of reproducing apparatuses that are compatible. The horizontal dot count represents the number of horizontal dots and the vertical dot count the number of vertical dots, the dots constituting the image data in question. At the end of the pointer information pointing to image data is address information that points to the starting address from which the image data in question are stored.

FIG. 3(B) depicts a typical constitution of the pointer information for pointing to the block to be referenced. Arrow coordinate data and a next image name character string are located between image menu identifiers 1F32 and 1F52. Address information is provided following the image menu end point identifier. The arrow coordinate data represent the coordinates (X, Y) of the arrow (i.e., icon) pointing to the item name to be referenced when the text, image or voice data identified by the item name are to be referenced from text data and reproduced. The address information points to the beginning of the block containing information for reproducing the image data to be referenced.

The pointer information for pointing to ADPCM-format voice data or CD-DA-format voice data is constituted as shown in FIG. 3(C) or 3(D). ADPCM-format voice data are compressed voice data that comply with the CD-ROM XA standards. CD-DA-format voice data are 16-bit PCM data that comply with the Red Book standards. Arrow coordinate data and a voice data name are located between voice data identifiers 1F33 and 1F53 in the case of ADPCM-format voice data, or between 1F34 and 1F54 in the case of CD-DA-format voice data. After the voice data end point identifier 1F53 or 1F54, there are provided reproduction information and starting/ending address data. The reproduction information accepts thereinto the coding information from the sub-header information in the first sector of voice information. The starting/ending address data constitute pointer information for pointing to the starting point and end point of the voice data to be referenced.

FIG. 3(E) shows a typical constitution of the pointer information for allowing one item of text (or image) data to reference another item of text data. The information comprises two another-item reference identifiers 1F42 and 1F62. Between the another-item starting point identifier 1F42 and the another-item end point identifier 1F62 are arrow coordinate data and a reference destination text name. The another-item end point identifier is followed by address information for pointing to the starting address form which the text data in question are stored.

Figure 4:
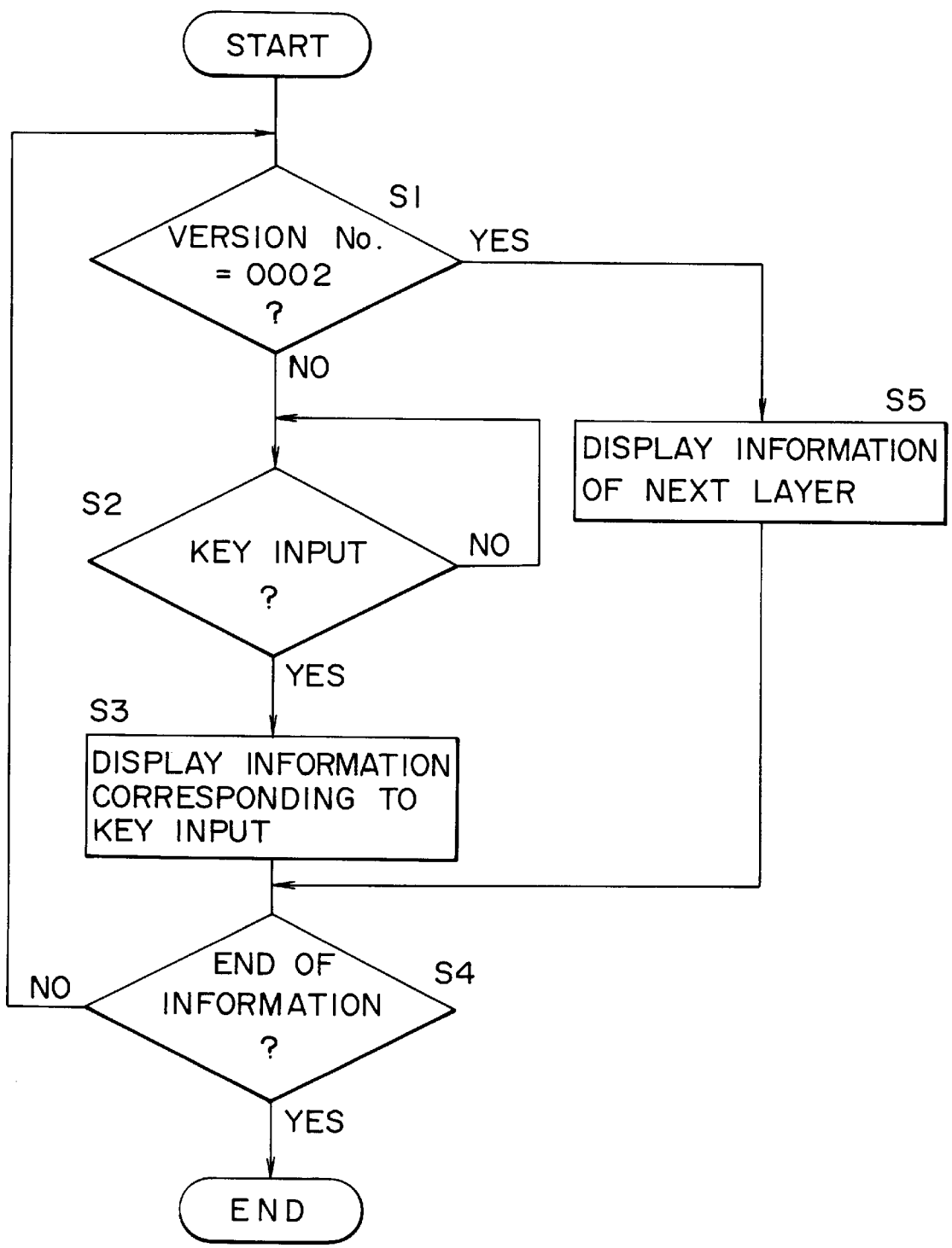
FIG. 4 is a view illustrating how a version number function of the embodiment of FIG. 1 works.

How the invention as it is embodied above works will now be described with reference to the flowchart of FIG. 4. The CPU 4 controls the optical disk drive 1 to reproduce information from the CD-ROM 12. The reproduced RF signal is coded by the data processor 2, and is fed through the I/O port 4 and the CPU 4 to the main RAM 6 for storage. In step S1, the CPU 4 checks to see if the version number of the first block to be reproduced is "0002." If the version number is not "0002," (i.e., number "0001" in effect), the CPU 4 goes to step S2 in which to wait for the user to select information through the input keyboard 7. When relevant information is selected in step S2, step S3 is reached in which the selected information is displayed. That is, the selected information is retrieved from the CD-ROM 12 and is sent through the data processor 2, I/O port 3 and display controller 8 to the VRAM 9 for storage. The image data stored in the VRAM 9 are read therefrom under control of the display controller 8 and displayed on the display unit 10. When the information of the current block is not judged to be the last in step S4, step S1 is reached again, and the process is repeated.

If the version number is found to be "0002" in step S1, step S5 is reached. In step S5, the information in the next lower layer is displayed (output) automatically without any selective input from the user. Step S5 is followed by steps S4 and S1, in that order, and the process is repeated likewise. Halfway through continuous data reproduction, the user may interrupt and resume the operation by manipulating the input keyboard 7 appropriately.

FIG. 5 shows a specific example of screens that are displayed in the above flow of steps. In this example, the version number of the first block is designated to be "0001." If the display unit 10 is currently showing a cartoon picture 0 representing the information of the first block, the screen remains unchanged until the user operates relevant keys on the input keyboard 7.

When the user operates the appropriate keys on the input keyboard 7, the information of the second block (cartoon picture 1) whose address is provided in the second layer of the first block is retrieved and displayed. Because the version number of the second block is designated to be "0002," the information recorded in the second layer is automatically output following the output of the first layer information (i.e., cartoon picture 1). The second layer comprises the address of cartoon voice 1. From this address, the cartoon voice 1 is retrieved and output through a speaker, not shown, incorporated in the display controller 10. When reproduction of the cartoon voice 1 comes to an end, the cartoon picture 2 of the third block whose address is recorded in the third layer of the second block is retrieved and displayed.

The version number of the third block is also designated to be "0002." Thus the cartoon voice 2 whose address is recorded in the second layer is retrieved and output through the speaker. With the reproduction of the cartoon voice 2 terminated, the cartoon picture 3 of the fourth block whose address is contained in the third layer of the third block is retrieved and displayed. The version number of the fourth block is also "0002." Thus the cartoon voice 3 whose address is recorded in the second layer is retrieved and output. The same process is repeated thereafter. In this case, another-item reference identifiers (i.e., identifiers for identifying text data to reference) that may exist in the first or second block are ignored, and the data in the next block are reproduced.

Thus according to the invention, program designers need only arrange information in a layered structure in which to reproduce the information block by block. This makes it possible to implement information retrieval systems easily, quickly and at low cost. The invention may also apply to recording media other than the CD-ROM and to the reproducing apparatuses for use with such media.

As described, the invention provides an information recording medium for recording information in units of blocks. The blocks contain continuous reproduction information for specifying whether the information in any block is to be reproduced continuously or selectively. This makes it possible to put information into a system easily, quickly and at low cost without the help of specialized programmers.

The invention also provides an information reproducing apparatus that discriminates the continuous reproduction information recorded on the above-described information recording medium and, depending on the result of the discrimination, reproduces continuously or selectively the information recorded in the layered manner on the medium. This arrangement eliminates the need for providing each information recording medium with a specialized program for information retrieval. With the same apparatus retrieving information from various information recording media without the help of the specialized retrieval program, the costs of both the media and the apparatus are reduced significantly.

While a preferred embodiment of the invention has been described using specific terms, such description is for illustrative purposes only, and it is to be understood that changes and variations may be made without departing from the spirit or scope of the following claims.

What is claimed is:

1. An information recording medium:
   a recording surface on which are recorded voice data, image data and text data as well as management information for managing said data, said management information including:
      address information, organized in a layered structure, about addresses on said recording medium at which said data to be reproduced are stored; and
      continuous reproduction information specifying any one of two ways in which to reproduce said data, one of said two ways being that in which said data are to be reproduced continuously, the other of said two ways being that in which said data are to be reproduced selectively.

2. An information recording medium according to claim 1, wherein said continuous reproduction information is recorded in each block so that said data will be designated to be reproduced in units of blocks in any one of said two ways.

3. An information recording medium according to claim 1, wherein said management information is recorded between a block starting identifier and a block ending identifier, and said management information includes image data pointer information which at least points direct to the image data to be reproduced and at least one of three kinds of pointer information consisting of pointer information of said management information, voice data pointer information and text data pointer information, said pointer information of said management information at least pointing to the management information to be referenced next, said voice data pointer information pointing to the voice data to be referenced next, and said text data pointer information pointing to the text data to be referenced next.

4. An information recording medium according to claim 3, wherein said image data pointer information, said management information pointer information, said voice data pointer information and said text data pointer information have a pointer starting identifier and a pointer ending identifier identifying each of the four different kinds of information.

5. An information recording medium according to claim 4, wherein said voice data pointer information comprises a pointer starting identifier and a pointer ending identifier corresponding to the format of each of different voice data which are recorded.

6. An information reproducing apparatus for reproducing an information recording medium on which are recorded, in units of blocks, reproduction data, including voice data, image data and text data as well as reproduction data management information including address information and continuous reproduction information, said address information being organized in a layered structure to designate addresses on the recording medium at which said reproduction data are stored, said continuous reproduction information specifying any one of two ways in which to reproduce said reproduction data, one of said two ways being that in which said reproduction data are to be reproduced continuously, the other of said two ways being that in which said reproduction data are to be reproduced selectively, said information reproducing apparatus comprising:
   discriminating means for discriminating said continuous reproduction information in each block; and
   reproducing means for reproducing said reproduction data in units of blocks and in any one of said two ways in which to reproduce said reproduction data depending on the result of the discrimination by said discriminating means.

7. An information reproducing apparatus according to claim 6, further comprising operating means for reproducing said reproduction data by said reproducing means in any one of two ways, one of said two ways being that in which said reproduction data are to be reproduced continuously, the other of said two ways being that in which said reproduction data are to be reproduced selectively.

8. An information reproducing apparatus according to claim 6, wherein said reproducing means comprises display means on which to display image data in any one of two ways in accordance with the address information about the image data recorded in each block, one of said two ways being that in which said image data are to be displayed continuously, the other of said two ways being that in which said image data are to be displayed selectively.

9. An information reproducing apparatus according to claim 6, wherein said reproducing means comprises means for nullifying the continuous reproduction of the text data contained in said reproduction data when said discriminating means finds said reproduction data to be those data that are to be reproduced continuously.

10. A combination of an information recording medium and an apparatus for reproducing the information recording medium, wherein on the information recording medium are recorded, in units of blocks, reproduction data, including voice data, image data and text data as well as reproduction data management information including address information and continuous reproduction information, the address information being organized in a layered structure to designate addresses on the recording medium at which the reproduction data are stored, the continuous reproduction information specifying any one of two ways in which to reproduce the reproduction data, a first way being that in which the reproduction data are to be reproduced continuously, a second way being that in which the reproduction data are to be reproduced selectively, and wherein the information reproducing apparatus includes:

reproducing means for reproducing data recorded on the information recording medium;
display means for displaying image data;
input means for entering commands from a user of the information reproducing apparatus;
a central processing unit (CPU);
a read only memory (ROM) connected to the CPU;
a random access memory (RAM) connected to the CPU;
a video random access memory (VRAM) connected to the display means for storing image data to be displayed by the display means;
an input/output (I/O) means for connecting the reproducing means the display means, the input means, and the CPU together, wherein the CPU controls the operations of the reproducing means, the display means, the ROM and the RAM;

and wherein the CPU discriminates the continuous reproduction information in each block and controls the reproducing means to reproduce the reproduction data in units of blocks and in any one of the two ways in which to reproduce the reproduction data depending on the result of the discrimination by the CPU.

11. The combination according to claim 10, wherein the CPU, upon determining from the continuous reproduction information of a given block of data in a series of blocks of data that the reproduction data of the given block is to be reproduced in the second way, causes the reproducing means to reproduce the given block and the display means to display image data of the given block and then awaits a further command to be input via the input means by a user of the combination.

12. The combination according to claim 10, wherein the CPU, upon determining from the continuous reproduction information of a given block of data in a series of blocks of data that the reproduction data of the given block is to be reproduced in the first way, causes the reproducing means to reproduce the given block and the display means to display image data of the given block and then, automatically, causes the reproducing means to reproduce a next given block as designated by address information contained in the given block, and the display means to display image data of the next given block and then to continually repeat this process for each next given block whose address is designated by the currently reproduced given block until the CPU determines from the continuous reproduction information of the currently reproduced given block that the information contained therein is to be reproduced in the second way, whereupon the CPU ceases reproduction of blocks of data from the recording medium and awaits a further command to be input via the input means by a user of the combination.

* * * * *